United States Patent
Tamura

(10) Patent No.: US 8,162,550 B2
(45) Date of Patent: Apr. 24, 2012

(54) IMAGE PICKUP APPARATUS AND IMAGE PICKUP SYSTEM

(75) Inventor: Akihiro Tamura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/097,599

(22) Filed: Apr. 29, 2011

(65) Prior Publication Data

US 2011/0200313 A1    Aug. 18, 2011

Related U.S. Application Data

(63) Continuation of application No. 12/755,805, filed on Apr. 7, 2010, now Pat. No. 7,955,010, which is a continuation of application No. 11/556,781, filed on Nov. 6, 2006, now Pat. No. 7,725,017.

(30) Foreign Application Priority Data

Nov. 9, 2005   (JP) .................. 2005-325254

(51) Int. Cl.
*G03B 17/00* (2006.01)
(52) U.S. Cl. ........................ 396/529; 359/827
(58) Field of Classification Search ............ 396/91, 396/102, 125, 529, 532; 359/819, 827; 348/375
See application file for complete search history.

(56) References Cited

U.S. PATENT DOCUMENTS

| 6,845,218 | B2 | 1/2005 | Miyasaka et al. |
| 7,494,293 | B2 | 2/2009 | Arimoto et al. |
| 7,583,893 | B2 | 9/2009 | Horii et al. |
| 2003/0142970 | A1 | 7/2003 | Nishida et al. |
| 2004/0052515 | A1 | 3/2004 | Nishida et al. |
| 2005/0013605 | A1 | 1/2005 | Kubo |
| 2005/0140816 | A1 | 6/2005 | Tschida et al. |

FOREIGN PATENT DOCUMENTS

| JP | 4-280239 | 10/1992 |
| JP | 2003-228114 | 8/2003 |
| JP | 2005-173314 | 6/2005 |
| JP | 2005-277564 | 10/2005 |

*Primary Examiner* — Clayton E LaBalle
*Assistant Examiner* — Autumn Parker
(74) *Attorney, Agent, or Firm* — Hamre, Schumann, Mueller & Larson, P.C.

(57) ABSTRACT

A camera apparatus and a camera system of the present invention are configured so that a lens unit is attachable/detachable. The lens unit contains at least a lens and an iris, and contains a memory storing setting information required for operating the lens and the iris. When a camera microcomputer checks detection information stored in a memory in a sub-microcomputer at a time of start-up of the camera apparatus, and first detection information is stored in the memory, the setting information is acquired from the lens unit. When second detection information is stored in the memory, the setting information is acquired from another memory in the camera apparatus. Due to this configuration, the time for shifting the switch-on to a photographable state is shortened, and the ease of convenience can be enhanced.

4 Claims, 6 Drawing Sheets

IMAGE PICKUP APPARATUS AND IMAGE PICKUP SYSTEM

This application is a Continuation of U.S. application Ser. No. 12/755,805, filed Apr. 7, 2010, which is a Continuation of U.S. application Ser. No. 11/556,781, filed Nov. 6, 2006, which applications are incorporated herein by reference.

BACKGROUND OF THE INVENTION

1. Field of the Invention

The present invention relates to a camera apparatus to which a lens unit is attachable/detachable. The present invention also relates to a camera system having a camera unit and a lens unit exchangeable with respect to the camera unit. In particular, the present invention relates to a system in which a camera unit and a lens unit can communicate with each other so that unique information of the lens unit can be communicated to the camera unit.

2. Description of Related Art

Recently, in a camera system of an exchangeable lens system, respective driving systems such as focus driving means, exposure driving means, and zoom driving means are provided on a lens unit side, and control means for controlling the respective driving systems on the lens unit side is provided on a camera unit side. Furthermore, the camera system includes communication means enabling control data to be communicated between the camera unit and the lens unit. The camera unit and the lens unit are configured so as to communicate lens data information, various pieces of control information, or status information unique to a lens via the communication means, whereby the operation on the lens unit side can be controlled from the camera unit side.

The above-described configuration in which a camera unit can be communicated with a lens unit is described, for example, in JP 4 (1992)-280239 A. In a camera system with an exchangeable lens system described in JP 4 (1992)-280239 A, in order for various kinds of lens units to be used, when a lens unit is mounted on a camera unit, setting information (lens data) set uniquely with respect to a lens is transmitted to the camera unit. On the camera unit side, various kinds of settings suitable for the lens unit mounted on the camera unit are performed based on the lens data transmitted from the lens unit.

Furthermore, JP 2005-173314 A discloses a configuration in which a camera system is set based on the mounting history of an accessory. Specifically, when an accessory such as an exchangeable lens is mounted on a camera unit, the camera unit obtains identification information from the accessory. The camera unit determines whether or not the accessory has been mounted previously, based on the identification information obtained from the accessory. In the case of determining that the accessory has been mounted previously, the camera unit applies the settings of the camera system with respect to the accessory that was mounted previously to the current settings.

However, according to the above-mentioned conventional configuration, when the lens unit is mounted on the camera unit, or when the camera unit with the lens unit mounted thereon is switched on, the camera unit performs processing of acquiring lens data from the lens unit, so that it takes a long time to obtain a photographable state from the time at which the lens unit is mounted on the camera unit or the time at which the camera unit is switched on. This lets a shutter chance slip away, causing a decrease in ease of operation.

More specifically, the conventional camera unit performs processing of acquiring lens data that is information unique to a lens from the lens unit every time the camera unit is switched on. The camera unit performs a setting such as autofocusing control, autoexposure control, or zoom control, based on the lens data acquired from the lens unit. The transmission/reception of lens data and the settings in the camera unit as described above are performed every time the camera unit is switched on, so that there is a problem that the state cannot be shifted to a photographable state immediately after the camera system is switched on.

Furthermore, a high-performance exchangeable lens has a large amount of lens data. When the amount of lens data is large, it takes a long time for the transmission/reception of lens data between the camera unit and the lens unit, which slows down the start-up of the camera system. Particularly, according to the configuration in which lens data is transmitted to the camera unit every time the camera system is switched on as in the prior art, and various kinds of settings are performed in the camera unit, the start-up of the camera system becomes much slower.

SUMMARY OF THE INVENTION

Therefore, with the foregoing in mind, it is an object of the present invention to provide a camera apparatus in which a shift time from switch-on to a photographable state is shortened to enhance the ease of operation. It is another object of the present invention to provide a camera system to which the camera apparatus is applied.

In order to solve the above-mentioned problems, a camera apparatus with a first configuration of the present invention is configured so that a lens unit is attachable/detachable, the lens unit containing at least a lens and an iris, and containing a memory storing setting information required for operating the lens and the iris. The apparatus includes: a communication part capable of communicating data with respect to the lens unit a mounting detector that monitors attachment/detachment of the lens unit, and outputs first detection information when the lens unit is mounted; a controller capable of acquiring the setting information from the lens unit via the communication part and outputting second detection information when acquiring the setting information; a first storage that stores either the first detection information outputted from the mounting detector or the second detection information outputted from the controller; and a second storage capable of storing the setting information acquired in the controller. The controller checks detection information stored in the first storage at a time of start-up of the camera apparatus. When the first detection information is stored in the first storage, the controller controls so that the setting information is acquired from the lens unit, and when the second detection information is stored in the first storage, the controller controls so that the setting information is acquired from the second storage.

A camera apparatus with a second configuration of the present invention is configured so that a lens unit, with a memory storing setting information required for operating a lens and an iris mounted thereon, is attachable/detachable, and includes a power cut-off function of cutting-off at least a power supply to the lens unit when a non-operation period continues for a predetermined period of time. The apparatus includes: a communication part capable of communicating data with respect to the lens unit; a mounting detector that monitors attachment/detachment of the lens unit, and outputs first detection information when the lens unit is mounted; a controller capable of acquiring the setting information from the lens unit via the communication part and outputting second detection information when acquiring the setting information; a first storage that stores either the first detection information outputted from the mounting detector or the second detection information outputted from the controller; and a second storage capable of storing the setting information acquired in the controller. The controller checks detection information stored in the first storage when the power cut-off function is stopped to start a power supply to the lens unit. When the first detection information is stored in the first storage, the controller controls so that the setting information is obtained from the lens unit, and when the second detection information is stored in the first storage, the controller controls so that the setting information is acquired from the second storage.

A camera apparatus with a third configuration of the present invention is configured so that a lens unit is attachable/detachable, the lens unit having a memory mounted thereon, the memory storing setting information required for operating a lens and an iris and identification information for identifying each lens unit. The apparatus includes a communication part capable of communicating data with respect to the lens unit; a controller capable of acquiring the identification information and the setting information from the lens unit via the communication part; and a second storage that previously stores identification information corresponding to various kinds of lens units and setting information corresponding to the identification information. At a time of start-up of the camera apparatus, the controller acquires the identification information from the lens unit, and checks whether or not identification information matched with the acquired identification information is stored in the second storage. When the identification information is stored in the second storage, the controller controls so that setting information corresponding to the identification information is read from the second storage, and when the identification information is not stored in the second storage, the controller controls so that the setting information is acquired from the lens unit.

A camera apparatus with a fourth configuration of the present invention is configured so that a lens unit, with a memory storing setting information required for operating a lens and an iris and identification information for identifying each lens unit mounted thereon, is attachable/detachable. The apparatus includes: a communication part capable of communicating data with respect to the lens unit; a mounting detector that monitors attachment/detachment of the lens unit, and outputs first detection information when the lens unit is mounted; a controller capable of acquiring the identification information and the setting information from the lens unit via the communication part and outputting second detection information when acquiring the identification information and the setting information; a first storage that stores either the first detection information outputted from the mounting detector or the second detection information outputted from the controller; and a second storage which previously stores identification information corresponding to various kinds of lens units and setting information corresponding to the identification information, and which is capable of storing the setting information acquired from the lens unit. At a time of start-up of the camera apparatus, the controller acquires the identification information from the lens unit, and checks whether or not identification information matched with the acquired identification information is stored in the second storage. When the identification information is stored in the second storage, the controller reads setting information corresponding to the identification information from the second storage, and when the identification information is not stored in the second storage, the controller checks detection information stored in the first storage, when the first detection information is stored in the first storage, acquires setting information from the lens unit, and when the second detection information is stored, acquires setting information from the second storage.

According to the camera apparatus and camera system of the present invention, the transmission operation of unique information or setting information from the lens unit to the camera unit at a time of start-up of the lens unit can be omitted in accordance with the state of the lens unit or the camera unit. Therefore, the lens unit can be started up quickly. Thus, in the camera unit, a shift time from switch-on to a photographable state can be shortened to enhance ease of operation.

Furthermore, in the case where a lens is started up from a state where the supply of power to the lens is stopped for power saving (a so-called sleep state of the camera unit and a power-off state of the lens unit), and photographing is performed, the start-up time of the camera system can be shortened. Therefore, there is a great effect that photographing can be performed without letting a photo opportunity slip away.

Furthermore, when the lens unit is mounted on the camera unit, the camera unit does not need to read identification information on the lens unit and can determine the configuration of a lens only based on the information of the mounting detector without performing communication. Therefore, there is a great effect that the camera system can speed up the start-up of a lens.

DETAILED DESCRIPTION OF THE INVENTION

Embodiment 1

[1. Configuration of a Camera System]

Figure 1:
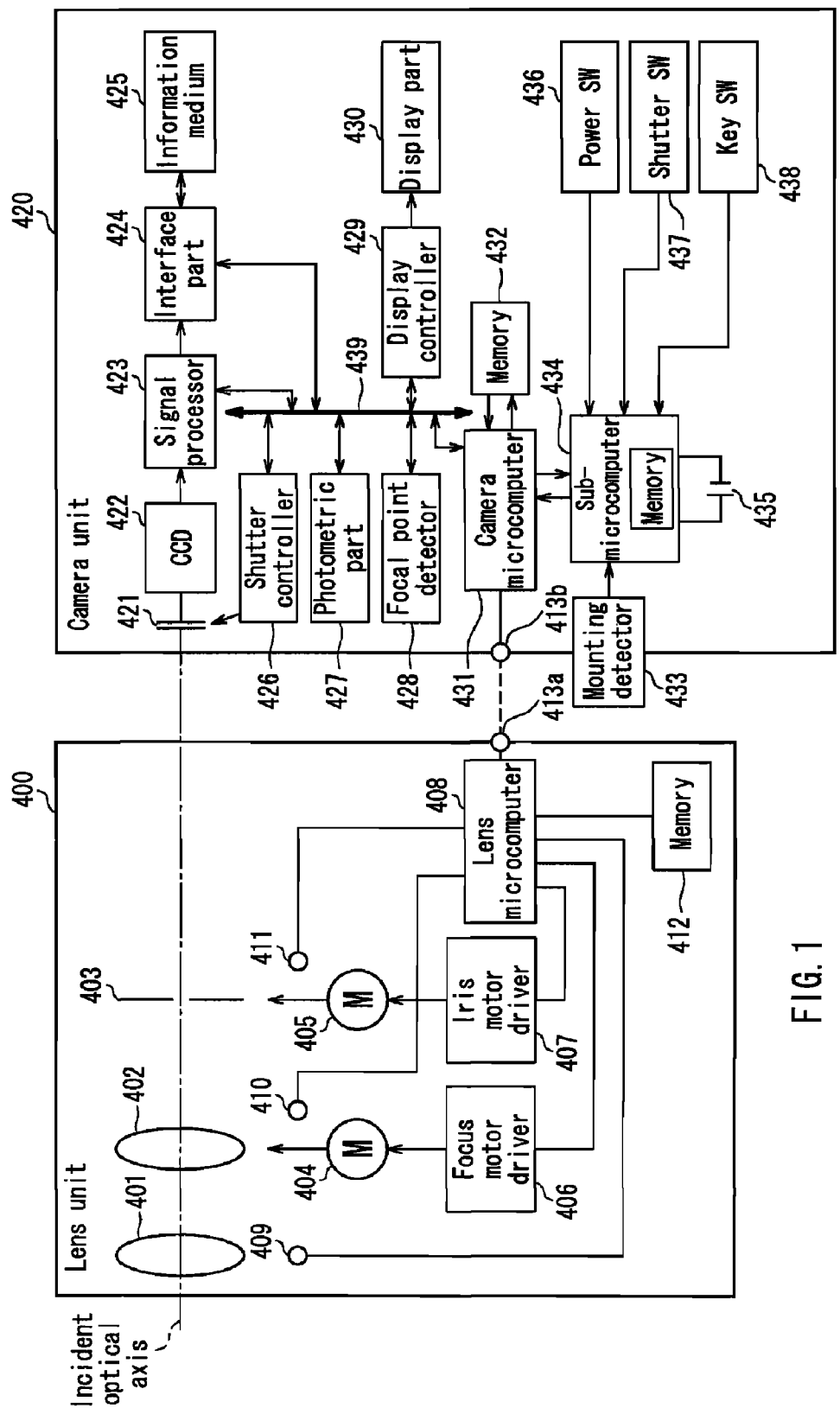
FIG. 1 is a block diagram showing the configuration of a camera system in Embodiment 1.

FIG. 1 is a block diagram showing a configuration of a camera system of an exchangeable lens system in the present embodiment. As shown in FIG. 1, the camera system of the present embodiment is composed of a lens unit 400 and a camera unit 420.

The lens unit 400 includes a zoom lens 401, a focus lens 402, an iris 403, a focus motor 404, an iris motor 405, a focus motor driver 406, an iris motor driver 407, a lens microcomputer 408, a zoom encoder 409, a focus encoder 410, an iris encoder 411, a memory 412, and a first communication terminal 413a.

The lens microcomputer 408 can control the driving of the focus motor 404 via the focus motor driver 406. This enables the focus motor 404 to operate the focus lens 402. Furthermore, the lens microcomputer 408 can control the driving of the iris motor 405 via the iris motor driver 407. This enables the iris motor 405 to operate the iris 403. Furthermore, the lens microcomputer 408 arithmetically obtains operation amounts of the focus lens 402 and the iris 403, based on the positional information of the focus lens 402 detected by the focus encoder 410, and the positional information of the iris 403 detected by the iris encoder 411. Furthermore, the lens microcomputer 408 can perform serial communication with respect to a camera microcomputer 431 via the first communication terminal 413a and a second communication terminal 413b. Furthermore, the lens microcomputer 408 controls the driving of the focus motor driver 406 and the iris motor driver 407, based on a command having a driving parameter transmitted from the camera microcomputer 431. Furthermore, the lens microcomputer 408 can transmit various pieces of information (an iris value, a defocus value, etc.) of the lens unit 400 to the camera microcomputer 431 by serial communication.

The memory 412 is composed of a non-volatile memory such as an electronically erasable and programmable read-only memory (EEPROM). The memory 412 stores setting information (hereinafter, referred to as "lens data") required for controlling the operation of the lens unit 400. The lens data is unique to the lens unit, and is set on the basis of the kind and type number of the lens unit 400. The lens data stored in the memory 412 contains information such as an iris value and a defocus amount. The data stored in the memory 412 is not limited to only lens data, and may be unique information containing other information as well as lens data. The detailed description of the lens data will be made later.

The zoom lens 401 is moved along an optical axis direction when a zoom ring (not shown) is rotated by a user. The zoom lens 401 moves along the optical axis direction, whereby an optical image to be incident can be enlarged or reduced. The position of the zoom lens 401 is read by the zoom encoder 409. The positional information read by the zoom encoder 409 is transmitted to the lens microcomputer 408. The zoom lens 401 may be configured so as to be moved electrically by a driving source such as a motor, instead of being configured so as to be moved manually by operating the zoom ring.

The focus lens 402 is moved along the optical axis direction by the focus motor 404. As a result of the movement of the focus lens 402 to a predetermined position, an optical image can be focused. The operation of the focus motor 404 is controlled by the focus motor driver 406 so that the focus lens 402 can move in a predetermined movement direction by a predetermined movement amount. Furthermore, the position of the focus lens 402 is read by the focus encoder 410. The positional information read by the focus encoder 410 is transmitted to the lens microcomputer 408.

The iris 403 is operated by the iris motor 405, whereby the passage light amount thereof is increased/decreased. The operation of the iris motor 404 is controlled by the iris motor driver 407 so that the iris 410 achieves a predetermined iris amount. Furthermore, the iris amount of the iris 403 is detected by the iris encoder 405. The iris amount information detected by the iris encoder 405 is transmitted to the lens microcomputer 408.

The camera unit 420 includes a shutter 421, a CCD 422 that is an image pickup element, a signal processor 423, an interface part 424, an information medium 425, a shutter controller 426, a photometric part 427, a focal point detector 428, a display controller 429, a liquid crystal display part 430, a camera microcomputer 431, a memory 432, a mounting detector 433, a sub-microcomputer 434, a battery 435, a power switch 436, a shutter switch 437, various kinds of key switches 438, and the second communication terminal 413b. Furthermore, the camera unit 420 has a mechanism in which the lens unit 400 is attachable/detachable. When the lens unit 400 is mounted on the camera unit 420, the first communication terminal 413a and the second communication terminal 413b are connected to each other electrically, and data can be communicated between the lens unit 400 and the camera unit 420.

The camera microcomputer 431 controls the operation of each part of the camera system. Furthermore, the camera microcomputer 431 measures a distance with an existing algorithm and arithmetically obtains a lens driving amount, based on an A/D value outputted from a distance-measuring sensor. The information on the arithmetically obtained lens driving amount is transmitted to the lens microcomputer 408 via the second communication terminal 413b and the first communication terminal 413a. Furthermore, the camera microcomputer 431 controls a motor (not shown) for mirror-up or mirror-down, based on a control signal. Furthermore, the camera microcomputer 431 can write the lens data transmitted from the lens microcomputer 408 in the memory 432, and read the lens data stored in the memory 432. Furthermore, the camera microcomputer 431 can perform the control of switching on/off the camera unit 420 and the lens unit 400, the control of operating a shutter, the control of various kinds of operations based on various kinds of key manipulations, and the like, due to the control from the sub-microcomputer 434. Furthermore, the camera microcomputer 431 transmits/receives a signal with respect to each part via a bus 439.

The display controller 429 controls so as to display a battery remaining amount of the camera system, a photographing number, a TV value (shutter speed value), an AV value (an iris value), an exposure correction value, and the like on the display part 430. In the present embodiment, although the display part 430 is composed of a liquid crystal display element, it may be composed of another display element as long as it can display similar information. Furthermore, in the present embodiment, although only the above-mentioned various pieces of information are displayed on the display part 430, the display part 430 may be composed of a color liquid crystal display element so that a video signal (a through image, a photographed image, etc.) outputted from the signal processor 423 is displayed together with the above-mentioned various pieces of information.

The focal point detector 428 includes a line sensor for autofocusing (hereinafter, referred to as "AF") by an existing phase difference detection system, and a circuit unit for accumulation and reading of the line sensor. The operation of the focal point detector 428 is controlled by the camera microcomputer 431.

The photometric part 427 performs the measurement of a light amount (photometric measurement) in an object by the operation control from the camera microcomputer 431. The information on the light amount measured in the photometric part 427 is transmitted to the camera microcomputer 431.

The shutter controller 426 controls the traveling of a front curtain and a rear curtain in the shutter 421. Specifically, the shutter controller 426 controls the operation of the shutter 421 so that the front curtain and the rear curtain can travel at a shutter speed that is arithmetically obtained by the camera microcomputer 431.

The sub-microcomputer 434 is supplied with power at all times by the battery 435, and hence, is operated even when the camera unit 420 is switched off. Furthermore, a memory is contained in the sub-microcomputer 434, and at least a lens flag is stored in the memory. The lens flag is set to be "1" when the camera unit 420 acquires lens data from the lens unit 400, and the acquired lens data is written in the memory 432. Furthermore, the lens flag is cleared to "0" when the attachment/detachment between the lens unit 400 and the camera unit 420 is detected in the mounting detector 433. Furthermore, the sub-microcomputer 434 reads the states of the power switch 436, the shutter switch 437, the various kinds of key switches 438, and the mounting detector 433, and instructs the camera microcomputer 431 to be operated.

The power switch 436 starts the operation of the camera system. Upon recognizing that the power switch 436 is turned on, the sub-microcomputer 434 transmits a command for starting the measurement of light, the measurement of a distance, display, and the like to the camera microcomputer 431.

The shutter switch 437 is synchronized with a release button of the camera system. Upon recognizing that the shutter switch 437 is turned on, the sub-microcomputer 435 transmits a command for starting an exposure operation to the camera microcomputer 431.

The various kinds of key switches 438 are composed of a switch for switching a mode (a TV priority mode, an AV priority mode, a manual operation mode, a program mode, etc.) of a camera, a switch for setting an AF mode (a one-shot AF, a servo AF for focusing an object at all times, etc.), a switch for switching and setting a photometric measurement mode (evaluation metering, centerweighted metering, partial metering, spot metering, etc.). Upon recognizing that the various kinds of switches are operated, the sub-microcomputer 434 instructs the camera microcomputer 431 to operate each function, thereby executing various kinds of functions.

The mounting detector 433 detects the attachment/detachment of the lens unit 400 with respect to the camera unit 420. A detection signal detected by the mounting detector 433 is outputted to the sub-microcomputer 434.

The shutter 421 is composed of a front curtain and a rear curtain whose operations are controlled by the shutter controller 426. The shutter 421 moves across an optical axis, thereby causing an optical image incident via the lenses 401, 402 and the iris 403 to be incident upon the CCD 422 for a predetermined period of time.

The CCD 422 converts the optical image to be incident into an electric signal and outputs it. Although the CCD 422 is composed of a CCD image sensor in the present embodiment, it may be composed of another image pickup element such as a CMOS image sensor.

The signal processor 423 performs various kinds of signal processes such as analog-digital conversion, adjustment of image quality, image compression, and the like with respect to the electric signal outputted from the CCD 422, and outputs image data.

The interface part 424 records image data outputted from the signal processor 423 on the information medium 425. The operation of the interface part 424 is not limited to recording of image data on the information medium 425, and the interface part 424 also can read image data recorded on the information medium 425.

The information medium 425 is composed of, for example, a memory card containing a semiconductor memory. The information medium 425 may be composed of another medium such as a disk-shaped recording medium, as long as at least a digital image can be recorded thereon.

[2. Operation of a Camera System]

[2-1. Basic Operation]

The description of a basic operation is predicated on the lens unit 400 being mounted on the camera unit 420.

In FIG. 1, first, when the power switch 436 is operated by a user so as to be turned on, the sub-microcomputer 434 outputs a start-up command to the camera microcomputer 431. The camera microcomputer 431 starts up each part in the camera unit 420 based on the inputted start-up command. Furthermore, the camera microcomputer 431 output a start-up command to the lens microcomputer 408 via the second communication terminal 413b and the first communication terminal 413a. The lens microcomputer 408 controls so as to start up the lens unit 400 based on the inputted start-up command. The lens microcomputer 408 outputs lens data stored in the memory 412 to the camera microcomputer 431.

The lens microcomputer 408 controls the focus motor driver 406 so as to move the focus lens 402 to a predetermined position with a command having a driving parameter transmitted from the camera microcomputer 431. Furthermore, the lens microcomputer 408 controls the iris motor driver 407 so that the iris 403 achieves a predetermined iris amount with the command having a driving parameter transmitted from the camera microcomputer 431.

Next, when the shutter switch 437 is operated by the user, the sub-microcomputer 434 outputs information indicating that the shutter switch 437 is operated to the camera microcomputer 431. Next, the camera microcomputer 431 controls a motor (not shown) of mirror-up, and after the mirror-up, controls the shutter controller 426 so that the shutter 421 is operated. The shutter controller 426 causes the front curtain and the rear curtain of the shutter 421 to travel at a predetermined timing. Due to the operation of the shutter 421, an optical image having passed through the zoom lens 401, the focus lens 402, and the like is incident upon the CCD 422 for a predetermined period of time.

The CCD 422 converts the incident optical image into an electric signal and outputs it. The electric signal outputted from the CCD 422 is inputted to the signal processor 423. The signal processor 423 performs signal processes such as analog-digital conversion, adjustment of image quality, image compression, and the like to the inputted electric signal. Image data after being subjected to the signal processing is stored on the information medium 425 via the interface part 424. The image data to be stored on the information medium 425 also can be stored as it is, without being compressed in the signal processor 423.

Furthermore, when the zoom ring is operated by the user so as to perform zooming, the zoom lens 401 is moved along the optical axis direction, and an optical image formed on the CCD 422 can be enlarged or reduced.

Furthermore, when the user presses the shutter switch 437 halfway down to perform autofocusing, the camera microcomputer 431 arithmetically obtains a movement direction and a movement amount of the focus lens 402 based on the focus information detected in the focal point detector 428. The information arithmetically obtained in the camera microcomputer 431 is inputted to the lens microcomputer 408 via the second communication terminal 413b and the first communication terminal 413a. The lens microcomputer 408 controls the focus motor driver 406 so that the focus lens 402 is moved, based on the inputted information. The focus motor driver 406 drives the focus motor 404 to operate the focus lens 402 so that the optical image formed on the CCD 422 is focused.

Furthermore, in the iris adjustment, the camera microcomputer 431 arithmetically obtains an iris amount based on the object light amount detected by the photometric part 427. The information arithmetically obtained by the camera microcomputer 431 is outputted to the lens microcomputer 408, and the lens microcomputer 408 controls the iris motor driver 407. The iris motor driver 407 operates the iris motor 405 to adjust the opening of the iris 403.

[2-2. Operation of the Camera Microcomputer 431]

Figure 2:
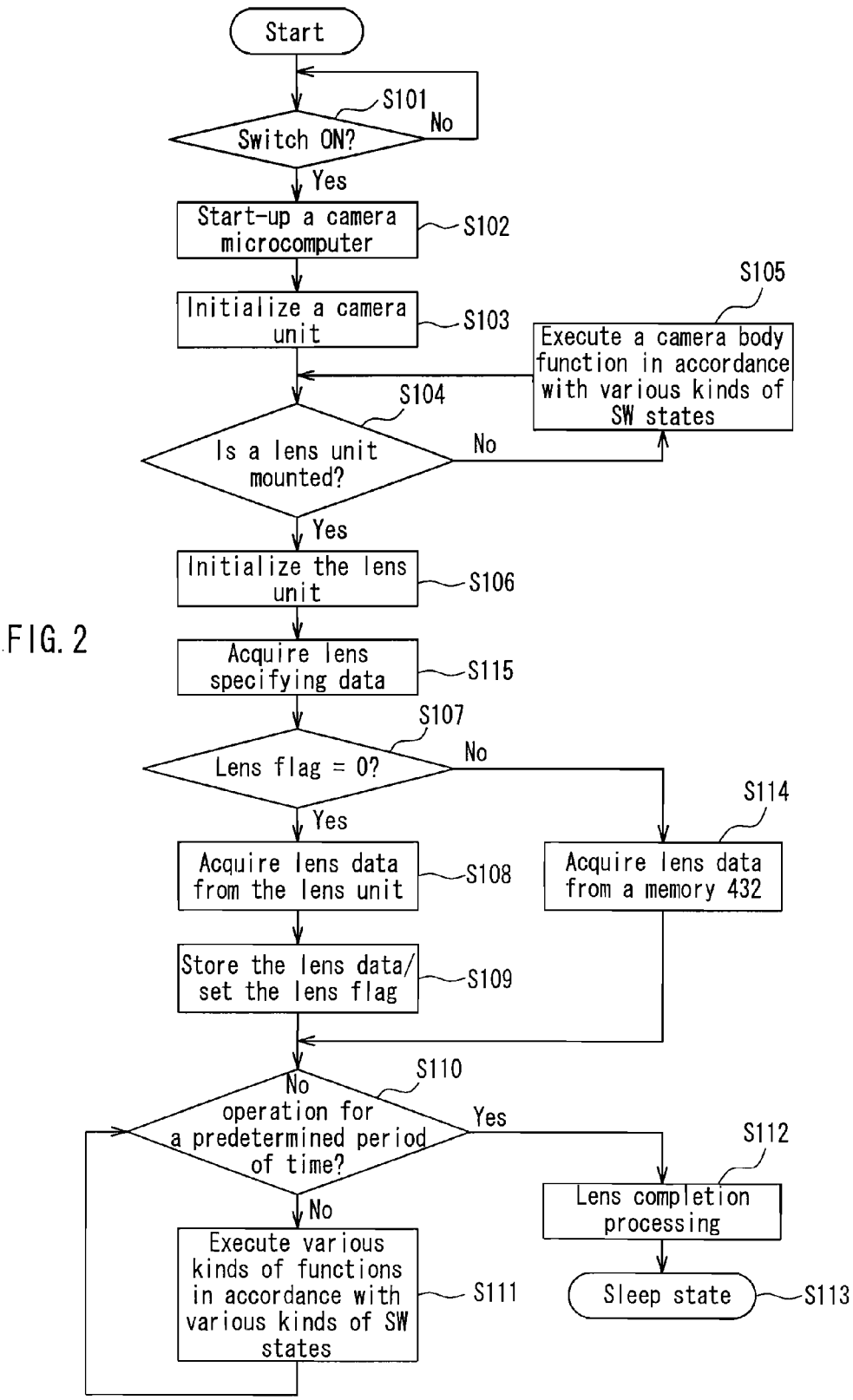
FIG. 2 is a flowchart illustrating the start-up operation of a camera microcomputer in Embodiment 1.

FIG. 2 is a flowchart illustrating the operation of the camera microcomputer 431.

First, when the camera unit 420 is switched on (Step S101), the camera microcomputer 431 is started up (Step S102).

Next, the camera microcomputer 431 initializes the internal setting of the camera unit 420. Specifically, the camera microcomputer 431 sets the selection state and setting state of operation switches such as the shutter switch 437 and the various kinds of key switches 438 in previously determined initial states (Step S103).

Next, the camera microcomputer 431 checks the state of the mounting detector 433, and determines whether or not the lens unit 400 is mounted (Step S104). Then, upon determining that the lens unit 400 is not mounted, the camera microcomputer 431 executes various kinds of functions of the camera unit 420 based on the various kinds of key switches 438 (Step S105).

On the other hand, when the camera microcomputer 431 determines that the lens unit 400 is mounted (Step S104), the camera microcomputer 431 supplies power to the lens unit 400 via a communication contact terminal 413. When the lens unit 400 is supplied with power, the lens microcomputer 408 is started up.

Next, the camera microcomputer 431 initializes the lens unit 400. Specifically, the lens microcomputer 408 controls the focus motor driver 406 to move the focus lens 402 to an initial position. Furthermore, the lens microcomputer 408 controls the iris motor driver 407 to shift the iris 403 to an initial state (Step S106).

Next, the camera microcomputer 431 outputs a command for requesting lens specifying data with respect to the lens microcomputer 408. The lens microcomputer 408 reads lens specifying data from the memory 412 in accordance with the inputted command, and outputs it to the camera microcomputer 431. The camera microcomputer 431 writes the acquired lens specifying data in the memory 432. The contents of the lens specifying data will be described in detail later (Step S115).

Next, the camera microcomputer 431 checks the state of a lens flag set in the sub-microcomputer 434, and determines whether or not the lens unit 400 has been attached/detached after the previous acquisition of lens data (Step S107). When the mounting detector 433 detects that the lens unit 400 has been attached/detached, the sub-microcomputer 434 clears the lens flag to "0". Furthermore, when the sub-microcomputer 434 recognizes that the camera microcomputer 431 acquired lens data from the lens unit 400 side via the first communication terminal 413a and the second communication terminal 413b, it sets the lens flag to "1". Thus, as a result of the determination in Step S107, when the lens unit 400 has not been attached/detached after the timing of the previous acquisition of lens data, the lens flag remains at "1", so that the process proceeds to Step S114. On the other hand, when the lens unit 400 has been attached/detached even once after the timing of the previous acquisition of lens data, the lens flag is cleared to "0", so that the process proceeds to Step S108.

As a result of the determination in Step S107, when the lens flag set in the sub-microcomputer 434 is cleared to "0", the camera microcomputer 431 outputs a command for requesting lens data with respect to the lens microcomputer 408 in the lens unit 400. The lens microcomputer 408 outputs lens data stored in the memory 412 to the camera microcomputer 431 via the first communication terminal 413a and the second communication terminal 413b in accordance with the inputted request (Step S108).

Next, the camera microcomputer 431 stores the lens data acquired from the lens microcomputer 408 in the memory 432. Furthermore, upon recognizing this, the sub-microcomputer 434 sets the lens flag in the sub-microcomputer 434 to "1". Furthermore, the camera microcomputer 431 controls the operation of the lens unit 400 based on the lens data acquired from the lens microcomputer 408. Furthermore, the camera microcomputer 431 can shift the camera unit 420 to a state where a photographing operation can be performed (Step S109).

On the other hand, as a result of the determination in Step S107, when the lens flag set in the sub-microcomputer 434 is set to "1", the lens data stored in the memory 432 is read without performing the communication between the lens unit 400 and the camera unit 420. The camera microcomputer 431 controls the operation of the lens unit 400 based on the lens data read from the memory 432. Furthermore, the camera microcomputer 431 can shift the camera unit 420 to a state where a photographing operation can be performed (Step S114).

Thus, when the lens flag is set to "1" at a time when the camera system is switched on, the operation of acquiring lens data with respect to the lens unit 400 and the operation of storing the lens data in the memory 432 are not performed, so that the camera system can be started up in a short period of time after the lens unit 400 is supplied with power, and various kinds of functions can be shifted to an executable state.

Next, the camera microcomputer 431 counts a non-operation time of the camera system with a counter, and determines whether or not the non-operation time has reached a predetermined time (for example, 5 minutes). More specifically, it is detected that the camera system has not been operated for a predetermined period of time When the camera system is operated by the time the value of the counter reaches a predetermined time, the counter is reset, and the process proceeds to Step S111. When the value of the counter reaches a predetermined time, the process proceeds to Step S112 (Step S110).

When the camera system is operated by the time the value of the counter reaches a predetermined time, the camera microcomputer 431 can execute various kinds of functions in accordance with the states of the power switch 436, the shutter switch 437, and the various kinds of key switches 438. More specifically, an object is photographed by operating the shutter switch 437, and a functional operation such as white balance adjustment can be performed by operating the key switches 438 (Step 111).

On the other hand, when the value of the counter reaches a predetermined time, the camera microcomputer 431 performs lens completion processing to stop the supply of power to the lens unit 400 (Step S112).

Next, the camera microcomputer 431 is shifted to a sleep state. The "sleep state" refers to the state in which the operations of a lens unit, an image pickup system, a display part, and the like are stopped when the camera unit is not operated temporarily when the power switch of the camera unit is in an ON state (Step S113).

When the camera microcomputer 431 is in a sleep state, the supply of power to each part in the camera unit 420 is stopped or reduced, and hence, various kinds of operations such as photographing cannot be performed. In order to return the sleep state to the normal state, for example, the power switch 436 is operated to newly switch on the camera system, or the shutter switch 437 or various kinds of key switches 438 are operated. The operation of the camera microcomputer 431 when the sleep state is returned to the normal state will be described later with reference to FIG. 4.

[2-3. Operation of the Sub-Microcomputer 434]

Figure 3:
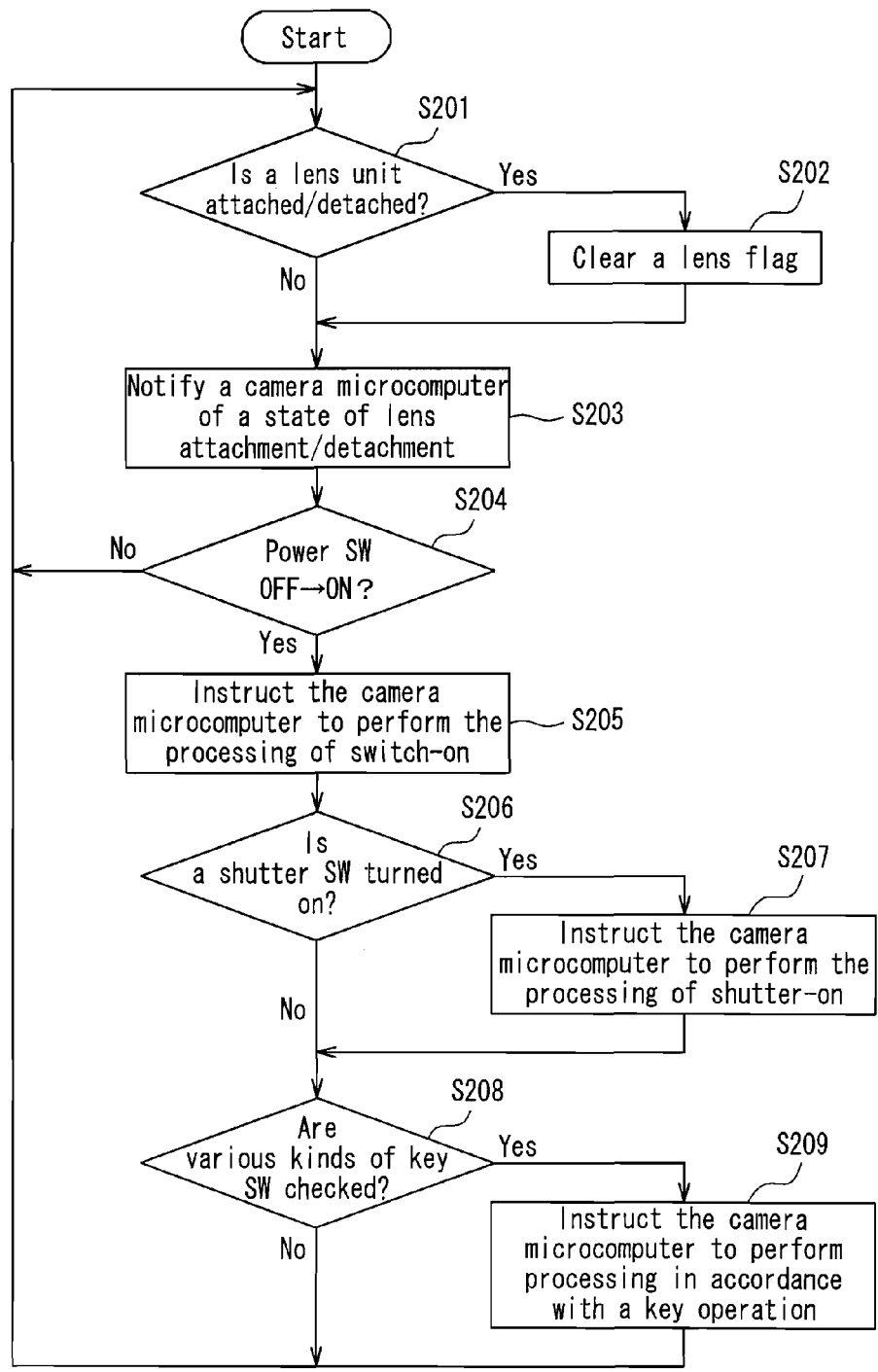
FIG. 3 is a flowchart illustrating the operation of a sub-microcomputer in Embodiment 1.

FIG. 3 is a flowchart illustrating an operation of the sub-microcomputer 434. The sub-microcomputer 434 is operated by being supplied with power from the battery 435, when the camera unit 420 is switched on and operates normally or it is in a sleep state.

First, the sub-microcomputer 434 checks the state of the mounting detector 433 (Step S201). Upon recognizing that the lens unit 400 is attached/detached with respect to the camera unit 420, the sub-microcomputer 434 clears the lens flag in the memory to "0" (Step S202). Furthermore, in the mounting detector 433, when the attachment/detachment of the lens unit 400 is not detected, the sub-microcomputer 434 does not change the lens flag in the memory.

Next, the sub-microcomputer 434 notifies the camera microcomputer 431 of the state of the mounting detector 433 (Step S203).

Next, the sub-microcomputer 434 checks the state of the power switch 436 (Step S204). Upon recognizing that the power switch 436 is changed from an ON state to an OFF state, the sub-microcomputer 434 instructs the camera microcomputer 431 to perform the processing of switch-on, and the process returns to Step S201.

Furthermore, upon recognizing that the power switch 436 is changed from an OFF state to an ON state, the sub-microcomputer 434 instructs the camera microcomputer 431 to perform the processing of switch-on (Step S205).

Next, when the power switch 436 is switched on, the sub-microcomputer 434 checks the state of the shutter switch 437 (Step S206). Upon recognizing that the shutter switch 437 is switched on, the sub-microcomputer 434 proceeds to Step S207. On the other hand, upon recognizing that the shutter switch 437 is not switched on (i.e., in the case where the shutter switch 437 is not operated), the sub-microcomputer 434 proceeds to Step S208.

When the shutter switch 437 is turned on, the sub-microcomputer 434 transmits an instruction of starting an exposure operation to the camera microcomputer 431 as the processing of switching on a shutter. The camera microcomputer 431 starts an exposure operation and performs photographing processing in accordance with the instruction from the sub-microcomputer 434 (Step S207).

Next, the sub-microcomputer 434 checks the states of the various kinds of key switches 438 (Step S208). Upon detecting that the states of the various kinds of key switches 438 have changed, the sub-microcomputer 434 instructs the camera microcomputer 431 to perform processing corresponding to the states of the various kinds of keys. The camera microcomputer 431 performs various processes in accordance with the instruction from the sub-microcomputer 434 (Step S209).

After the processing in Step S209, or when no change of the state of the key switches 438 is detected in Step S208, the process returns to Step S201. The sub-microcomputer 434 repeats these processes, thereby performing ordinary loop processing.

[2-4. Operation in a Sleep State]

Figure 4:
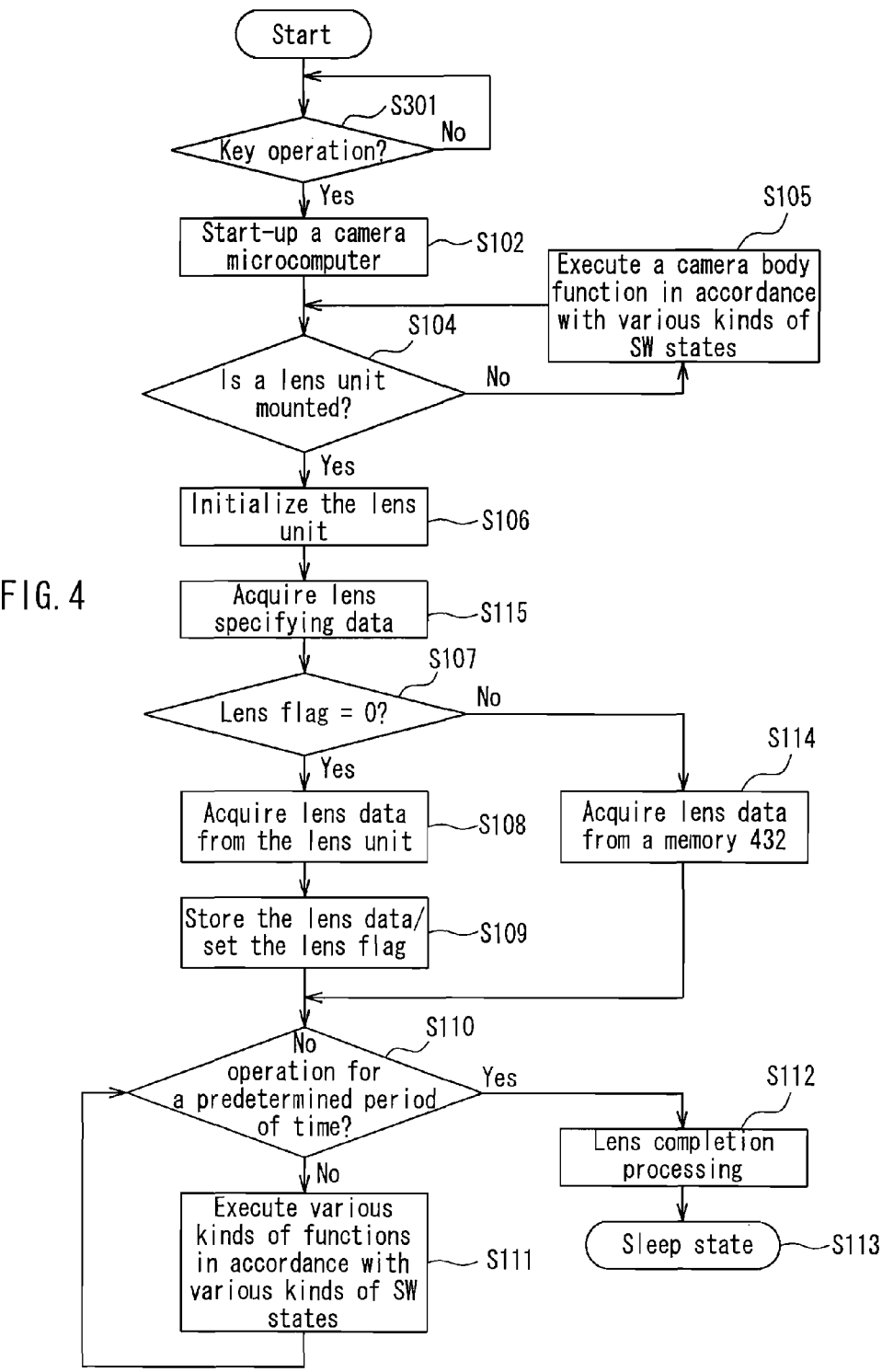
FIG. 4 is a flowchart illustrating the operation at a time when the camera microcomputer in Embodiment 1 is in a sleep state.

FIG. 4 is a flowchart illustrating the operation of the camera microcomputer 431 in a sleep state. In FIG. 4, the same steps as those in FIG. 2 are denoted with the same reference numerals as those therein, and the detailed description thereof will be omitted.

First, the sub-microcomputer 434 checks whether or not the operations of the power switch 436 and the shutter switch 437 have been performed when the camera system is in a sleep state. When the operations have been performed, the process proceeds to Step S102 (Step S301).

Next, the camera microcomputer 431 is started up based on a start-up command inputted from the sub-microcomputer 434. The camera microcomputer 431 controls so that each part in the camera unit 420 is started up. The state setting of the camera unit is held even in a sleep state, so that the initialization processing of the camera unit 420 is not performed.

The processes after Step S104 are the same as those after Step S104 in FIG. 2, so that the operation description thereof will be omitted. More specifically, if the lens unit 400 is not attached/detached with respect to the camera unit 420 in a sleep state, lens data is not acquired, so that the camera system can be started up at a high-speed, and shifted to a photographable state.

[3. Contents of Data]

Table 1 shows the contents of lens specifying data acquired by the camera microcomputer 431 from the lens microcomputer 408 in Step S115 in FIGS. 2 and 4.

TABLE 1

| Data No. | Lens data item | Method for using lens data in a body |
|---|---|---|
| A | Lens identification data | Lens unique information such as presence/absence of an iris ring and presence/absence of an optical shaking correction function |
| B | Manufacturer ID | Use for identifying a lens unit |
| C | Lens ID | Use for identifying a lens unit |
| D | Lens name | Use for identifying a lens unit |

In Table 1, the data A relates to the specification of the lens unit 400, and contains information on the presence/absence of an iris ring, the presence/absence of an optical shaking correction function, and the like. The Data B is an ID of a manufacturer of the lens unit 400. The data C is an ID of the lens unit 400. The data D contains information on the name of the lens unit 400.

As shown in Table 1, the lens specifying data contains information capable of specifying the kind and type of the lens unit, such as the lens identification data and the lens ID. This enables the camera microcomputer 431 to identify a lens unit mounted on the camera unit 420.

Furthermore, Tables 2 and 3 show lens data acquired by the camera microcomputer 431 from the lens unit 400, or lens data acquired by the camera microcomputer 431 from the memory 432 in Steps S108 and S114 in FIGS. 2 and 4. The lens data shown in Tables 2 and 3 are referred to as "characteristics data".

TABLE 2

| Data No. | Lens data item | Method for using lens data in a body |
|---|---|---|
| A | Resolution number of a zoom encoder | Number of zoom positions having lens data from a wide-angle end to a telephoto end |
| B | Resolution number of a focus encoder | Number of focus positions having lens data from an infinite distance to a close distance |
| C | Focal length (wide-angle end) | Focal length in a wide-angle end of a zoom lens (mm) |
| D | Focal length (telephoto end) | Focal length in a telephoto end of a zoom lens (mm) |

TABLE 3

| Data No. | Lens data item | Method for using lens data in a body |
|---|---|---|
| A | Focal length | Focal length at each zoom position (mm) |
| B | Opened iris value (AV value) | Iris value for each zoom position in an iris open state |

TABLE 3-continued

| Data No. | Lens data item | Method for using lens data in a body |
| --- | --- | --- |
| C | Minimum iris value (AV value) | Iris value for each zoom position in an iris minimum state |
| D | Opened iris value at a time of photometric measurement (AV value) | Use for AE control |
| E | Focusing threshold | Focusing is determined based on whether or not a defocus amount is in a range of a focusing thresh at a time of AF control |
| F | Pulse number between an infinite position and a close position | Drive a focus lens within a pulse number at a time of AF control |
| G | Closest photographing distance | Photographable distance at a closest position (mm) |
| H | AF correction value | Use for AF correction |

In Table 2, the data A is the number of zoom positions from a telephoto end to a wide-angle end of the zoom lens 401 in the lens unit 400. The data B is the number of focus positions from an infinite position to a close position of the focus lens 402. The data C is data on a focal length at a wide-angle end of the zoom lens 401. The data D is data on a focal length at a telephoto end of the zoom lens 401.

The characteristics data shown in Table 3 are set so as to correspond to respective zoom encoder positions (zoom positions) divided by a zoom encoder division number represented by the data A in Table 2. For example, when the zoom encoder division number represented by the data A in Table 2 is "32", 32 kinds of patterns are set in the characteristics data shown in Table 3.

In Table 3, the data A is data on a focal length at each zoom encoder position of the zoom lens 401. The data B is an iris value (AV value) at a time when the iris 403 is opened. The data C is an iris value (AV value) at a time when the iris 403 is in a minimum state. The data B and C represent iris values at a time of photographing. The data D is an opened iris value at a time of photometric measurement, which is an iris value used for controlling an auto exposure (AE). The data E is a reference value (focusing threshold) for determining a focused state at a time of AF control. More specifically, the data E is a value for determining a focused state by comparing a defocus amount with a reference value at a time of AF control, and determining whether or not the defocus amount is in the range of the reference value. The range of the value of the data E increases as a zoom angle increases. The data F is the number of pulses from an infinite position to a close position of the focus lens 402. The data G is a distance at which an object can be photographed at a closest position, which is a distance from the object to an image pickup plane of the CCD 422. The data H is a value for correcting an error at a time of AF control, caused by a displacement in terms of an optical design of the focus lens 402.

The camera microcomputer 431 determines methods for controlling a focus and controlling an iris based on the characteristics data shown in Tables 2 and 3.

Furthermore, the camera microcomputer 431 acquires a parameter (hereinafter, referred to as lens state data) regarding the current state of the lens unit 400 periodically from the lens unit 400. Table 4 shows lens state data acquired by the camera microcomputer 431 from the lens unit 400.

TABLE 4

| Data No. | Lens data item | Method for using lens data in a body |
| --- | --- | --- |
| A | Current lens state | Use for notification of an operation state of a lens unit |
| B | Current zoom position | Use for controlling the driving of a lens and an iris |
| C | Current iris value | Use for controlling the driving of an iris |
| D | Current focus lens position | Use for controlling the driving of a lens |

In Table 4, the data A represents the current state of the lens unit 400. For example, the data A contains information such as "the focus lens 402 is being driven", "the iris 403 is being driven", and "the zoom lens 401 is positioned at a telephoto end or a wide-angle end". The data B represents the current zoom encoder position (zoom position). The data C is data on a current iris value. The data D represents the current position of the focus lens 402.

As shown in Table 4, the lens state data contains the current operation state of the lens unit 400, a zoom position, an iris value, and the like. The lens state data changes in accordance with the operation of the lens unit 400. The lens specifying data, characteristics data, and lens state data are not limited to those shown respectively in Tables.

In the case were the camera system is switched on, or in the case where a key operation is performed when the camera system is in a sleep state, the camera microcomputer 431 acquires the lens specifying data shown in Table 1 from the lens unit 400, and acquires characteristics data shown in Table 2 from the lens unit 400 or the memory 432. This enables the camera microcomputer 431 to shift the camera system to a photographable state.

Furthermore, when the camera system is placed in a photographable state, the camera microcomputer 431 acquires lens state data shown in Table 4 from the lens unit 400. The camera microcomputer 431 determines a subsequent control command regarding focus control and iris control, based on the characteristics data shown in Tables 2 and 3, and the lens state data shown in Table 4. This enables the camera microcomputer 431 to perform focus control and iris control of the lens unit 400. Although the lens data shown in Tables 1 to 4 are data for performing focus control and iris control, they may contain lens data for performing zoom control

[4. Effects of an Embodiment, Etc.]

As described above, according to the present embodiment, when the lens unit 400 has not been attached/detached after the previous acquisition of lens data when the power switch 436 of the camera system is shifted from an OFF state to an ON state, the start-up of the camera system can be sped up. More specifically, when the camera system is switched on, first, it is checked whether the lens unit 400 has been attached/detached after the previous acquisition of lens data. In the case where the lens unit 400 has not been attached/detached, the camera microcomputer 431 is operated based on the lens data stored in the memory 432, without acquiring lens data (lens specifying data and characteristics data). This makes it unnecessary for the camera unit 420 to acquire lens data from the lens unit 400 and write the acquired lens data in the memory 432, whereby the start-up of the camera system can be sped up.

In particular, the effect of a high-speed start-up is effective for a user who rarely attaches/detaches or exchanges the lens unit 400, and leaves one lens unit mounted on the camera unit for long periods.

Furthermore, since serial communication is not performed between the camera unit 420 and the lens unit 400, and the acquisition of lens data can be omitted only with the determination processing in the camera unit 420, the determination processing also can have a simple configuration.

Furthermore, even if the amount of lens data stored in the lens unit 400 increases along with the enhancement of performance of an exchangeable lens, although the acquisition and storage of lens data are required at an initial switch-on, these processes can be omitted later. Therefore, the camera system can be started-up at a high speed.

Furthermore, in the present embodiment, one lens data corresponding to one lens unit is stored in the memory 432, so that a memory for storing lens data on a number of exchangeable lenses is not necessary, and the cost of a memory can be reduced.

Furthermore, the mechanism for selecting one lens data from a plurality of lens data is not necessary, so that a very simple configuration can be achieved.

Furthermore, a lens start-up time can be shortened at a time of returning from a sleep state, so that photographing can be performed without letting a photo opportunity slip away.

Furthermore, when the lens unit 400 is mounted on the camera unit 420, the camera unit 420 does not need to read identification information on the lens unit 400, and can determine the configuration of a lens only based on the information of the mounting detector 433 without performing communication. Therefore, the start-up of a lens can be sped up.

When the lens unit 400 is attached/detached with respect to the camera unit 420 when the camera system is in an ON state, the camera microcomputer 431 acquires lens data from the lens unit 400, and stores the lens data in the memory 432.

Furthermore, in the above description, a camera system in which a lens unit can be exchanged has been described. However, the present invention also can be applied similarly to a camera system having the following configuration: at a time of start-up of a camera, the unique information on an accessory such as a strobe, a flash, a teleconverter, or an intermediate ring is transmitted to a camera unit, whereby the unique information is set in the camera unit.

Furthermore, although the lens control of an exchangeable lens has been described regarding autofocusing control and autoexposure control, the present invention is not limited thereto, and other lens data on a lens for performing optical shaking correction control, etc. may be stored in the memory 412.

Embodiment 2

Figure 5:
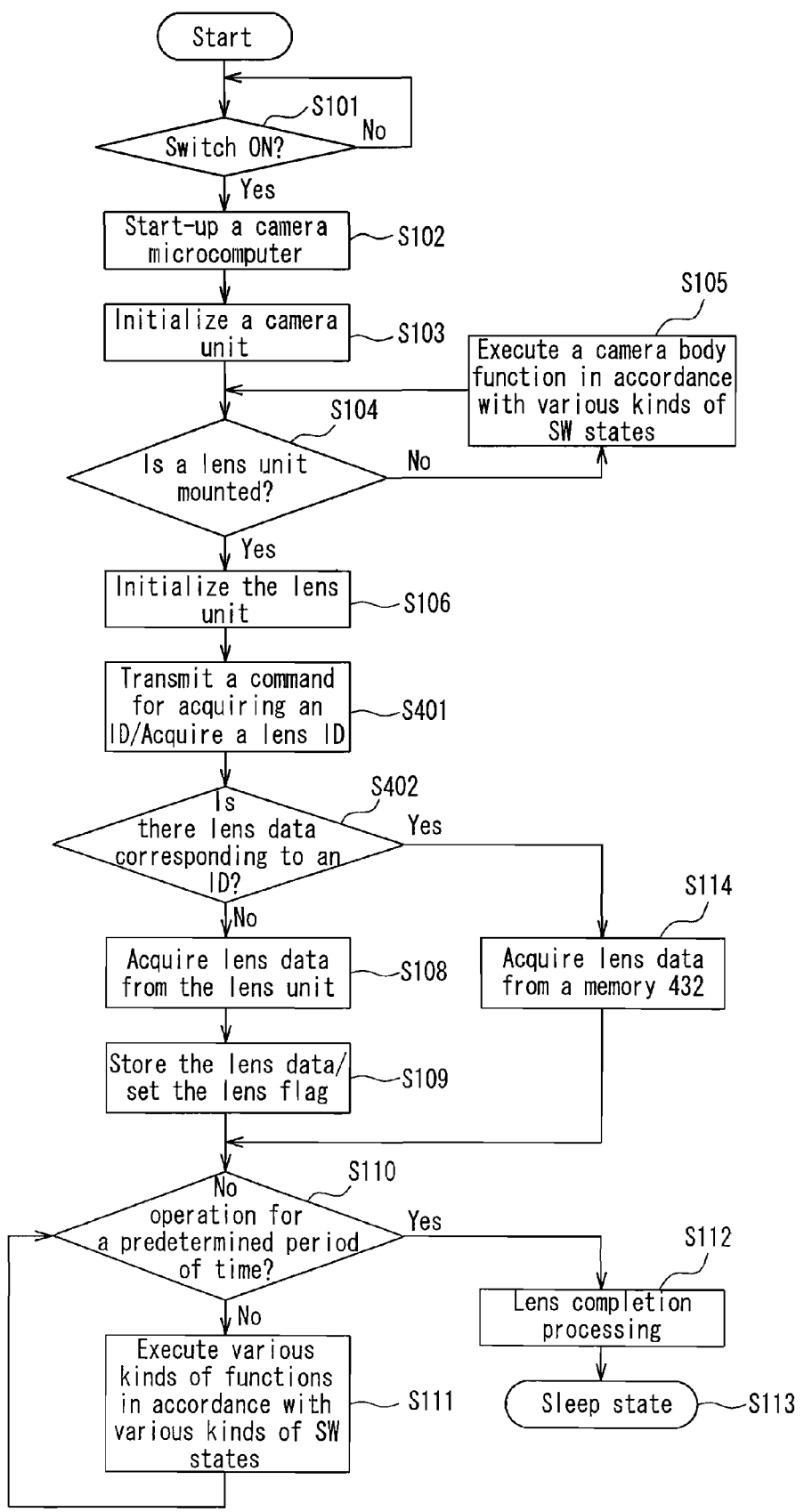
FIG. 5 is a flowchart illustrating the start-up operation of a camera microcomputer in Embodiment 2.

FIG. 5 is a flowchart showing an operation of a camera microcomputer of embodiment 2. In FIG. 5, the same steps as those in the flowchart in FIG. 2 are denoted with the same reference numerals as those therein, and the detailed description thereof will be omitted.

Furthermore, the camera microcomputer of Embodiment 2 is operated based on the block diagram shown in FIG. 1; however, the data stored in the memories 412 and 432 are different between Embodiments 1 and 2. In the memory 412 of Embodiment 2, unique information composed of identification information (hereinafter, referred to as a "lens ID") set for each lens and setting information (hereinafter, referred to as "lens data") containing a focus lens position, an iris amount, and the like is written. Furthermore, in the memory 432, a plurality of pieces of unique information, composed of a lens ID varying for each type and each product no. and lens data corresponding to the lens ID, are written. The identification information (lens ID) in Embodiment 2 is the same as the lens specifying data in Embodiment 1. More specifically, the "lens ID" in Embodiment 2 is different from the "lens ID" in Table 1, and is the same as the lens specifying data containing all the data in Table 1. The setting information (lens data) in Embodiment 2 is the same as the characteristics data in Embodiment 1. Thus, the unique information in Embodiment 2 corresponds to the lens specifying data and the characteristics data in Embodiment 1.

Furthermore, the lens data in unique information contains information required for controlling various operations of a focus, an iris, a zoom, and the like, so that the amount of the lens data is large. In particular, recently, various functions such as an optical shaking correction function are added to a lens unit to increase the data amount of setting information, and hence, the lens unit is composed of data of several kilobytes. On the other hand, the lens ID is identification information set for each lens, so that the lens ID is composed of a small amount of data of several bytes. Furthermore, even if the lens unit is made multi-functional, the data amount of the lens ID does not increase.

Furthermore, the memory 432 is composed of, for example, an EEPROM. In the memory 432, unique information composed of a lens ID corresponding to a lens type and product no. and lens data corresponding to the lens ID are previously written at a time of shipment from a factory. Furthermore, the memory 432 also can be composed of a read-only memory (ROM). If the memory 432 is composed of a ROM, the cost can be reduced compared with the case where the memory 432 is composed of an EEPROM.

Furthermore, the unique information previously written in the memory 432 may be configured so as to be updated by a user. More specifically, the number of pieces of unique information increases every time a new type is put on sale from a lens manufacturer, and in order to render the camera unit to handle a new lens, it is necessary to update the unique information written in the memory 432. As the update method, for example, there is a method for downloading new unique information from the Internet, storing the downloaded unique information on an information medium such as a memory card, mounting the information medium on the camera unit 420, and performing an update operation of the memory 432. As the method for updating unique information, there also is a method for connecting a camera system to a personal computer through a communication cable, transferring the unique information downloaded from the Internet to the camera system via the communication cable, and performing an update operation. Furthermore, the data may be updated by replacing all the unique information in the memory 432, or adding differential data to the existing unique information.

In FIG. 5, first, when the camera unit 420 is switched on (Step S101), the camera microcomputer 431 is started up (Step S102).

Next, the camera microcomputer 431 initializes the internal setting of the camera unit 420. Specifically, the camera microcomputer 431 sets the selection state and setting state of operation switches such as the settings of the shutter switch 437 and the various kinds of key switches 438 in the camera unit in previously determined initialized states (Step S103).

Next, the camera microcomputer 431 checks the state of the mounting detector 433, and determines whether or not the lens unit 400 is mounted (Step S104). Upon determining that the lens unit 400 is not mounted on the camera unit 420, the camera microcomputer 431 executes various kinds of functions of the camera unit 420 based on the various kinds of key switches 438 (Step S105).

On the other hand, upon detecting that the lens unit 400 is mounted on the camera unit 420, the camera microcomputer 431 supplies power to the lens unit 400 via the communication contact terminal 413. when the power is supplied to the lens unit 400, the lens microcomputer 408 is started up.

Next, the camera microcomputer 431 initializes the lens unit 400. Specifically, the lens microcomputer 408 controls the focus motor driver 406 to move the focus lens 402 to an initial position, based on the control from the camera microcomputer 431. Furthermore, the lens microcomputer 408 controls the iris motor driver 407 to shift the iris 403 to an initial state, based on the control from the camera microcomputer 431 (Step S106).

Next, the camera microcomputer 431 outputs a command for requesting the lens ID with respect to the lens microcomputer 408. The lens microcomputer 408 reads a lens ID from the memory 412 and outputs it to the camera microcomputer 431, in accordance with the inputted command (Step S401).

Next, the camera microcomputer 431 searches for a lens ID matched with the lens ID acquired from the lens unit 400 in the lens IDs stored in the memory 432. If there is a lens ID matched with the acquired lens ID, lens data corresponding to that lens ID is read from the memory 432, as shown in Step S114 (Step S402).

On the other hand, when there is no lens ID matched with the lens ID acquired from the lens unit 400 in the memory 432, lens data is acquired from the lens unit (Step S108).

The subsequent processing operation is the same as that of Embodiment 1, so that the description thereof will be omitted.

As described above, according to the present embodiment, when the camera system is switched on, only a lens ID is acquired from the lens unit 400, and when there is a lens ID matched with the acquired lens ID in the memory 432 on the camera unit 420 side, operation control is performed based on the lens data written in the memory 432. This makes it unnecessary to perform the processing of acquiring lens data from the lens unit 400 and the processing of writing the acquired lens data in the memory 432, so that the start-up of the camera system can be sped up.

Furthermore, since only the lens ID that is a part of unique information is acquired from the lens unit 400, the communication between the lens unit 400 and the camera unit 420 is completed in a short period of time, whereby the start-up of the camera system can be sped up.

Embodiment 3

Figure 6:
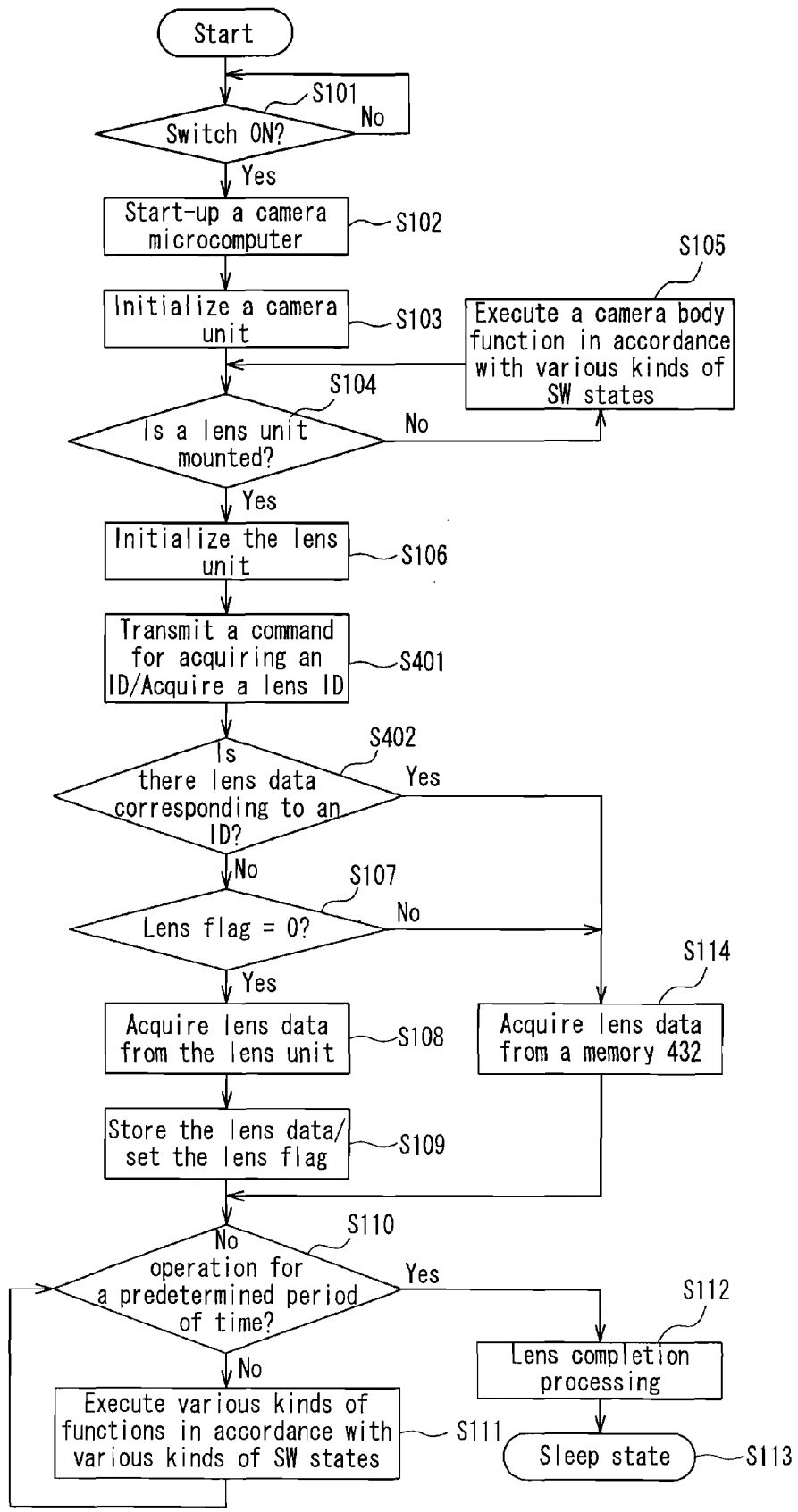
FIG. 6 is a flowchart illustrating the start-up operation of a camera microcomputer in Embodiment 3.

FIG. 6 is a flowchart showing an operation of a camera microcomputer of Embodiment 3. In FIG. 3, the same steps as those in the flowcharts in FIGS. 2 and 5 are denoted with the same reference numerals as those therein, and the detailed description thereof will be omitted.

The camera microcomputer of Embodiment 3 is operated based on the block diagram shown in FIG. 1; however, the configuration of the memory 432 is different between Embodiments 1 and 3. The memory 432 of the camera unit 420 includes a first region capable of storing lens data (hereinafter, referred to as "first lens data") acquired from the lens unit 400, and a second region storing unique information composed of a lens ID and lens data (hereinafter, referred to as "second lens data") previously written at a time of shipment from a factory. In Embodiment 3, although the first lens data and the unique information are stored in one memory 432, the following configuration also may be possible: a rewritable memory (e.g., an EEPROM) and a read-only memory (e.g., a ROM) are provided independently, the first lens data is stored in the rewritable memory, and the unique information is stored in the read-only memory.

As shown in FIG. 6, after the initialization processing of the lens unit (Step S106), the camera microcomputer 431 outputs a command for requesting a lens ID with respect to the lens microcomputer 408. The lens microcomputer 408 reads a lens ID from the memory 412 and outputs it to the camera microcomputer 431 in accordance with the inputted command (Step S401).

Next, the camera microcomputer 431 searches for a lens ID matched with the lens ID acquired from the lens microcomputer 408 in the lens IDs stored in the memory 432 (Step S402). If there is a lens ID matched with the lens ID acquired from the lens microcomputer 408 in the memory 432, the camera microcomputer 431 reads lens data corresponding to the lens ID from the memory 432.

On the other hand, when there is no lens ID matched with the lens ID acquired from the lens microcomputer 408 in the memory 432, the process proceeds to Step S107.

Next, the camera microcomputer 431 checks the state of a lens flag set in the sub-microcomputer 434, and determines whether the lens unit 400 has been attached/detached from the previous acquisition of lens data (Step S107). When the mounting detector 433 detects that the lens unit 400 has been attached/detached, the sub-microcomputer 434 clears a lens flag to "0". Furthermore, when the camera microcomputer 431 acquires lens data from the lens microcomputer 408 via the first communication terminal 413a and the second communication terminal 413b and stores it in memory 32. Upon recognizing this, the sub-microcomputer 434 sets the lens flag to "1". Thus, as a result of the determination in Step S107, when the lens unit 400 has not been attached/detached after the timing of the previous acquisition of lens data, the lens flag remains at "1", so that the process proceeds to Step S114. On the other hand, when the lens unit 400 has been attached/detached even once after the timing of the previous acquisition of lens data, the lens flag has been cleared to "0", so that the process proceeds to Step S108.

Next, the camera microcomputer 431 outputs a command for requesting lens data with respect to the lens microcomputer 408. The lens microcomputer 408 outputs the lens data stored in the memory 412 to the camera microcomputer 431 via the first communication terminal 413a and the second communication terminal 413b, in accordance with the inputted request (Step S108).

Next, the camera microcomputer 431 stores the lens data acquired from the lens microcomputer 408 in the memory 432. Upon recognizing this, the sub-microcomputer 434 sets the lens flag to "1". The camera microcomputer 431 can control the operation of the lens unit 400, and shift the camera unit 420 to a photographable state, based on the lens data acquired from the lens microcomputer 408 (Step S109).

The subsequent processing operation is the same as that of Embodiment 1, so that the description thereof will be omitted.

As described above, according to the present embodiment, it is not necessary to perform the processing of acquiring lens data from the lens unit 400, and the processing of writing the acquired lens data in the memory 432, so that the start-up of the camera system can be sped up.

Furthermore, since only the lens ID that is a part of unique information is acquired from the lens unit 400, the communication between the lens unit 400 and the camera unit 420 is completed in a short period of time, whereby the start-up of the camera system can be sped up.

In Embodiments 1-3, the lens to be mounted on the lens unit 400 is not limited to a zoom lens, and may be a unifocal lens. In the case of the unifocal lens, only data related to a focus and an iris among the data shown in Tables 2, 3, and 4 are transmitted/received between the camera unit 430 and the lens unit 400. In this case, the contents of the data are essentially the same, with only the amount of each data being reduced.

Furthermore, although Embodiments 1-3 have a configuration in which the lens flag is stored in the memory which is in the sub-microcomputer 434, the lens flag also may be stored in the camera microcomputer 431. In that case, a memory is configured in the camera microcomputer 431, and the lens flag is arranged to be stored therein. Also, the operation for setting the lens flag is done by the camera microcomputer 431.

Furthermore, although Embodiments 1-3 have a configuration in which the camera microcomputer 431 and the sub-microcomputer 434 are individual microcomputers, they also may be configured as only one microcomputer. In that case, the only one microcomputer may be configured so as to perform both functions of the camera microcomputer 431 and the sub-microcomputer 434.

[Note 1]

A first camera apparatus of the present invention is a camera apparatus to which a lens unit is attachable/detachable, capable of acquiring unique information set in the lens unit, including: a communication part to which the unique information is inputted from the lens unit; a storage capable of storing the unique information inputted to the communication part; and a controller that controls so that the unique information is outputted to the lens unit, wherein the controller controls so that the unique information is acquired from the lens unit only when an operation of attaching/detaching the lens unit is performed.

According to the above configuration, the transmission operation of unique information from the lens unit to the camera unit at a time of start-up of the lens unit can be omitted in accordance with the state of the lens unit or the camera unit. Therefore, the lens unit can be started up at a high speed. Thus, in the camera unit, a shift time from switch-on to a photographable state can be shortened to enhance ease of operation.

Furthermore, when the lens unit is mounted on the camera unit, the camera unit does not need to read identification information on the lens unit and can determine the configuration of a lens only based on the information of the mounting detector without performing communication. Therefore, the camera system can speed up the start-up of a lens greatly.

The unique information corresponds to lens specifying data and characteristics data. The communication part corresponds to the first communication terminal 413a, the second communication terminal 413b, and means for driving them. The storage corresponds to the memory in the sub-microcomputer 434 and the memory 432. The controller corresponds to the camera microcomputer 431.

[Note 2]

A second camera apparatus of the present invention is a camera apparatus to which a lens unit is attachable/detachable, the lens unit containing at least a lens and an iris, and containing a memory storing setting information required for operating the lens and the iris, the apparatus including: a communication part capable of communicating data with respect to the lens unit; a mounting detector that monitors attachment/detachment of the lens unit, and outputs first detection information when the lens unit is mounted; a controller capable of acquiring the setting information from the lens unit via the communication part and outputting second detection information when acquiring the setting information; a first storage that stores either the first detection information outputted from the mounting detector or the second detection information outputted from the controller; and a second storage capable of storing the setting information acquired in the controller, wherein the controller checks detection information stored in the first storage at a time of start-up of the camera apparatus, when the first detection information is stored in the first storage, controls so that the setting information is acquired from the lens unit, and when the second detection information is stored in the first storage, controls so that the setting information is acquired from the second storage.

According to the above configuration, the transmission operation of setting information from the lens unit to the camera unit at a time of start-up of the lens unit can be omitted in accordance with the state of the lens unit or the camera unit. Therefore, the lens unit can be started up at a high speed. Thus, in the camera unit, a shift time from switch-on to a photographable state can be shortened to enhance ease of operation.

Furthermore, when the lens unit is mounted on the camera unit, the camera unit does not need to read identification information on the lens unit and can determine the configuration of a lens only based on the information of the mounting detector without performing communication. Therefore, the camera system can speed up the start-up of a lens greatly.

The setting information corresponds to lens data (characteristics data). The communication part corresponds to the first communication terminal 413a, the second communication terminal 413b, and means for driving them. The mounting detector corresponds to the mounting detector 433. The first storage corresponds to the memory in the sub-microcomputer 434. The second storage corresponds to the memory 432. The controller corresponds to the camera microcomputer 431.

[Note 3]

A third camera apparatus of the present invention is a camera apparatus to which a lens unit, with a memory storing setting information required for operating a lens and an iris mounted thereon, is attachable/detachable, and which includes a power cut-off function of cutting-off at least a power supply to the lens unit when a non-operation period continues for a predetermined period of time, the apparatus including: a communication part capable of communicating data with respect to the lens unit; a mounting detector that monitors attachment/detachment of the lens unit, and outputs first detection information when the lens unit is mounted; a controller capable of acquiring the setting information from the lens unit via the communication part and outputting second detection information when acquiring the setting information; a first storage that stores either the first detection information outputted from the mounting detector or the second detection information outputted from the controller; and a second storage capable of storing the setting information acquired in the controller, wherein the controller checks detection information stored in the first storage when the power cut-off function is stopped to start a power supply to the lens unit, when the first detection information is stored in the first storage, controls so that the setting information is obtained from the lens unit, and when the second detection information is stored in the first storage, controls so that the setting information is acquired from the second storage.

According to the above configuration, the start-up time from the state where the supply of power to the lens is stopped for power saving (a so-called sleep state of the camera unit and a power-off state of the lens unit) to a photographable state can be shortened. Therefore, there is a great effect that photographing can be performed without letting a photo opportunity slip away.

Furthermore, when the lens unit is mounted on the camera unit, the camera unit does not need to read identification information on the lens unit and can determine the configuration of a lens based only on the information of the mounting detector without performing communication. Therefore, the camera system can speed up the start-up of a lens greatly.

The setting information corresponds to lens data (characteristics data). The communication part corresponds to the first communication terminal 413a, the second communication terminal 413b, and means for driving them. The mounting detector corresponds to the mounting detector 433. The first storage corresponds to the memory in the sub-microcomputer 434. The second storage corresponds to the memory 432. The controller corresponds to the camera microcomputer 431.

[Note 4]

In the second and third camera apparatuses of the present invention, the mounting detector is capable of detecting that the lens unit is mounted when a power source of the camera apparatus is in an ON or OFF state, and the first storage stores either the first detection information or the second detection information at all times.

According to the above configuration, even when the camera apparatus is in an OFF state, the mounting of the lens unit can be detected. Therefore, it is not necessary to detect the mounting when the camera apparatus is switched on, whereby the start-up of the camera system can be shortened. Thus, photographing can be performed without letting a photo opportunity slip away.

[Note 5]

A camera apparatus of the present invention is a camera apparatus to which a lens unit is attachable/detachable, the lens unit having a memory mounted thereon, the memory storing setting information required for operating a lens and an iris and identification information for identifying each lens unit, the apparatus including: a communication part capable of communicating data with respect to the lens unit; a controller capable of acquiring the identification information and the setting information from the lens unit via the communication part; and a second storage that previously stores identification information corresponding to various kinds of lens units and setting information corresponding to the identification information, wherein, at a time of start-up of the camera apparatus, the controller acquires the identification information from the lens unit, and checks whether or not identification information matched with the acquired identification information is stored in the second storage, when the identification information is stored in the second storage, controls so that setting information corresponding to the identification information is read from the second storage, and when the identification information is not stored in the second storage, controls so that the setting information is acquired from the lens unit.

According to the above configuration, when the camera system is switched on, only the identification information is acquired from the lens unit, and when the identification information matched with the acquired identification information is present in the second storage, the operation is controlled based on the setting information written in the second storage. This makes it unnecessary to perform the processing of acquiring setting information from the lens unit and the processing of writing the acquired setting information in the second storage, so that the start-up of the camera system can be sped up.

Furthermore, only the identification information that is a part of unique information is acquired from the lens unit. Therefore, the communication between the lens unit and the camera unit is completed in a short period of time, whereby the start-up of the camera system can be sped up.

The setting information corresponds to lens data (characteristics data). The communication part corresponds to the first communication terminal 413a, the second communication terminal 413b, and means for driving them. The mounting detector corresponds to the mounting detector 433. The first storage corresponds to the memory in the sub-microcomputer 434. The second storage corresponds to the memory 432. The controller corresponds to the camera microcomputer 431.

[Note 6]

A fifth camera apparatus of the present invention is a camera apparatus to which a lens unit, with a memory storing setting information required for operating a lens and an iris and identification information for identifying each lens unit mounted thereon, is attachable/detachable, the apparatus including: a communication part capable of communicating data with respect to the lens unit a mounting detector that monitors attachment/detachment of the lens unit, and outputs first detection information when the lens unit is mounted; a controller capable of acquiring the identification information and the setting information from the lens unit via the communication part and outputting second detection information when acquiring the identification information and the setting information; a first storage that stores either the first detection information outputted from the mounting detector or the second detection information outputted from the controller; and a second storage which previously stores identification information corresponding to various kinds of lens units and setting information corresponding to the identification information, and which is capable of storing the setting information acquired from the lens unit, wherein, at a time of start-up of the camera apparatus, the controller acquires the identification information from the lens unit, and checks whether or not identification information matched with the acquired identification information is stored in the second storage, when the identification information is stored in the second storage, reads setting information corresponding to the identification information from the second storage, and when the identification information is not stored in the second storage, checks detection information stored in the first storage, when the first detection information is stored in the first storage, acquires setting information from the lens unit, and when the second detection information is stored, acquires setting information from the second storage.

According to the above configuration, it is not necessary to perform the processing of acquiring setting information from the lens unit and the processing of writing the acquired setting information in the second storage, so that the start-up of the camera system can be sped up.

Furthermore, only the identification information that is a part of unique information is acquired from the lens unit. Therefore, the communication between the lens unit and the camera unit is completed in a short period of time, whereby the start-up of the camera system can be sped up.

The setting information corresponds to lens data (characteristics data). The communication part corresponds to the first communication terminal 413a, the second communication terminal 413b, and means for driving them. The mounting detector corresponds to the mounting detector 433. The first storage corresponds to the memory in the sub-microcomputer 434. The second storage corresponds to the memory 432. The controller corresponds to the camera microcomputer 431.

[Note 7]

In a fourth camera apparatus of the present invention, the second storage may be composed of a read-only memory. According to this configuration, the cost can be reduced.

[Note 8]

In second to fifth camera apparatuses, the controller may be capable of controlling any one of autofocusing, autoexposure, and shaking correction in the lens unit.

According to the above configuration, when any one of autofocusing, autoexposure, and shaking correction is controlled, lens state data is acquired from the lens unit, and various kinds of controls can be performed based on the acquired lens state data and the previously acquired setting information. Thus, the amount of data to be communicated at a time of various kinds of controls is small, so that various kinds of controls can be performed with a high response.

[Note 9]

A camera system of the present invention includes the camera apparatus according to any one of the first to fifth camera apparatuses, and a lens unit being attachable/detachable to the camera apparatus and capable of communicating data with respect to the camera apparatus.

According to the above configuration, the transmission operation of unique information from the lens unit to the camera unit at a time of start-up of the lens unit can be omitted in accordance with the state of the lens unit or the camera unit. Therefore, the lens unit can be started up at a high speed. Thus, in the camera unit, a shift time from switch-on to a photographable state can be shortened to enhance ease of operation.

Furthermore, when the lens unit is mounted on the camera unit, the camera unit does not need to read identification information on the lens unit and can determine the configuration of a lens only based on the information of the mounting detector without performing communication. Therefore, the camera system can speed up the start-up of a lens greatly.

The present invention is useful for a camera system to which a lens unit and a camera unit are attachable/detachable, and in which information can be communicated between the lens unit and the camera unit.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A camera apparatus to which a lens unit, with a memory storing setting information required for operating a lens and an iris mounted thereon, is attachable/detachable, and including a power cut-off function of cutting-off at least a power supply to the lens unit when a non-operation period continues for a predetermined period of time, the apparatus comprising:
   a communication part capable of communicating data with respect to the lens unit;
   a detector that monitors attachment/detachment of the lens unit, and outputs first detection information when the lens unit is detached;
   a controller capable of acquiring the setting information from the lens unit via the communication part and outputting second detection information when acquiring the setting information;
   a first storage that stores either the first detection information outputted from the detector or the second detection information outputted from the controller; and
   a second storage that stores the setting information when the controller acquires the setting information,
   wherein the controller checks detection information stored in the first storage after the power cut-off function is stopped to start a power supply to the lens unit,
   when the first detection information is stored in the first storage, controls so that the setting information is acquired from the lens unit mounted on the camera apparatus, and
   when the second detection information is stored in the first storage, controls so that the setting information is acquired from the second storage.

2. The camera apparatus according to claim 1, wherein the first storage stores either the first detection information or the second detection information at all times.

3. The camera apparatus according to claim 1, wherein the controller is capable of controlling any one of autofocusing, autoexposure, and shaking correction in the lens unit.

4. A camera system comprising:
   the camera apparatus according to claim 1; and
   a lens unit being attachable/detachable to the camera apparatus and capable of communicating data with respect to the camera apparatus.

* * * * *

UNITED STATES PATENT AND TRADEMARK OFFICE
CERTIFICATE OF CORRECTION

| | | |
|---|---|---|
| PATENT NO. | : 8,162,550 B2 | Page 1 of 1 |
| APPLICATION NO. | : 13/097599 | |
| DATED | : April 24, 2012 | |
| INVENTOR(S) | : Tamura | |

It is certified that error appears in the above-identified patent and that said Letters Patent is hereby corrected as shown below:

Front Page, (*) Notice, below "U.S.C. 154 (b) by 0 days." insert --This patent is subject to a terminal disclaimer.--

Signed and Sealed this
Eighth Day of January, 2013

David J. Kappos
*Director of the United States Patent and Trademark Office*